United States Patent [19]

Tegge et al.

[11] Patent Number: 4,713,413
[45] Date of Patent: Dec. 15, 1987

[54] REMOVAL OF ORGANIC HALIDES FROM HYDROCARBON SOLVENTS

[75] Inventors: Bruce R. Tegge, Madison; Frank G. Weary, Westfield, both of N.J.; Yasuo Sakaguchi, Yokahama, Japan

[73] Assignee: Exxon Chemical Patents Inc., Linden, N.J.

[21] Appl. No.: 814,100

[22] Filed: Dec. 27, 1985

[51] Int. Cl.$^4$ ................................. C08F 8/22
[52] U.S. Cl. .................... 525/54; 525/332.3; 525/356; 585/823
[58] Field of Search ............ 525/54, 332.3, 356; 585/823

[56] References Cited

U.S. PATENT DOCUMENTS

| | | | |
|---|---|---|---|
| 2,347,945 | 5/1944 | Frey | 260/683.4 |
| 2,391,149 | 12/1945 | Frey | 196/41 |
| 2,412,220 | 12/1946 | Ibach et al. | 196/41 |
| 3,242,148 | 3/1966 | Kinchen et al. | 525/332.3 |
| 3,862,900 | 1/1975 | Reusser | 208/262 |
| 3,864,243 | 2/1975 | Reusser et al. | 208/262 |
| 3,966,692 | 6/1976 | Driscoll et al. | 525/332.3 |
| 4,020,117 | 4/1977 | Sisson | 260/652 P |
| 4,250,270 | 2/1981 | Farrar | 525/54 |

FOREIGN PATENT DOCUMENTS

| 1438246 | 6/1976 | United Kingdom . |
|---|---|---|
| 506597 | 6/1976 | U.S.S.R. . |

*Primary Examiner*—Joseph L. Schofer
*Assistant Examiner*—Bernard Lipman

[57] ABSTRACT

Halogenated hydrocarbons are removed from hydrocarbon solvents for reuse in a butyl rubber process by contacting the halide containing hydrocarbon solvent with alumina at a temperature of at least 20° C. In particular 2-methyl-3-chloropropene-1, 2-methyl-1,2-dibromo-3-chloropropane and tribromo isobutane or mixtures thereof can be removed from a hydrocarbon solvent by the process of this invention. The halide removal is preferably carried out at a temperature of at least 40° C., e.g., 60° C. to 100° C.

11 Claims, No Drawings

REMOVAL OF ORGANIC HALIDES FROM HYDROCARBON SOLVENTS

BACKGROUND OF THE INVENTION

Butyl rubber was one of the earlier synthetic rubbers to be developed. While it quickly replaced other rubbers for use in inner tubes because of its low gas permeability, it was the discovery of halogenated butyl rubbers which lead to the success of tubeless tires. The halogenated butyl rubbers can readily be compounded for effective bonding cures with the tire carcass.

In the manufacture of halogenated butyl rubber residual amounts of isoprene and isobutylene monomer are also halogenated. Where the halogenation is carried out in a solvent, these and other organic halides become concentrated in the solvent, and ultimately the concentration of organic halides in the final rubber product increases.

One of the chlorides produced during the halogenation of butyl rubber is 2-methyl-3-chloropropene (MAC). Because of its volatility characteristics, this compound generally concentrates in the solvent (hexane) used for the chlorination. Where the solvent is used interchangeably for chlorination and bromination of butyl rubber, MAC is converted during the bromination process to 2-methyl-1,2-dibromo-3-chloropropane (MDBCP).

While many of the hydrocarbon halides are objectionable from an environmental standpoint, of particular concern is methyl-dibromo-chloro-propane (MDBCP), a highly toxic, potentially carcinogenic compound, which also may cause male sterility.

Many techniques are known for removing halides from process streams. For example, in the production of methyl chloride and methylene chloride by the (oxy) chlorination of methane, the chlorides can be recovered by gas phase adsorption in beds of adsorbent materials including silica gels, activated carbon, activated aluminum, molecular sieves or their combinations; see U.S. Pat. No. 4,020,117. The adsorption is carried out at about $-50°$ C. to about $20°$ C. The adsorbed halides are stripped from the adsorption stage at about $100°-400°$ C.

Similarly, German Pat. No. 2,839,516 discloses a process for purifying an exhaust gas stream to remove contaminants such as halogens or halogenated hydrocarbons by passing the gas through alumina or calcium compounds.

British Pat. No. 1,438,246 discloses a process for reacting a chloroform process stream containing impurities by contacting the stream in the vapor phase with activated carbon or alumina. It is alleged that $CH_2ClBr$, which is present as impurities in the chloroform, reacts to form $CHCl_2Br$ and $CH_2Cl_2$, which are then readily separated from the chloroform by distillation.

Soviet Union Pat. No. 506,597 teaches the purification of recycled methylene chloride-isobutylene stream by passing the compounds first in the vapor phase over alumina and then in the liquid phase at $10°-20°$ C. It is disclosed that the process removes microparticles of water, dimethyl ether and HCl from the stream.

U.S. Pat. No. 2,347,945 discloses a method for removing organic fluorides from a hydrocarbon stream either in the liquid or gaseous phase by contacting the stream with a "contact material." The contact material can be alumina, hydrated bauxite, chromium oxide and metals from the iron groups, especially nickel deposited on an inert support.

U.S. Pat. No. 3,864,243 discloses a process for the removal of combined chlorine (organic or inorganic) from a hydrocarbon stream by percolating the hydrocarbon through a bed of dehydrated activated alumina, e.g., bauxite. The adsorption process is said to be more effective at room temperature than at elevated temperatures, e.g., $98°$ C. Similarly, U.S. Pat. No. 3,862,900 discloses the room temperature adsorption of organic halides on molecular sieve (pore size 7–11 Å).

U.S. Pat. No. 2,412,220 discloses a process for the removal of organic fluorides from a hydrocarbon stream by passing the hydrocarbon through a bed of alumina which is catalytically active for hydrogenation or dehydrogenation. It is alleged that the effluent stream contains silicon fluorides which are subsequently removed by treating the hydrocarbon stream with an alkali metal hydroxide, e.g., NaOH, and then filtering the hydrocarbon stream through a non-siliceous granular filter medium, e.g., charcoal. In a similar vein, U.S. Pat. No. 2,391,149 discloses the removal of fluorides from a hydrocarbon stream by contacting the hydrocarbon with alumina which has been impregnated with an alkali metal hydroxide.

While the art generally teaches the use of materials such activated carbon and alumina for the purification of halide containing process streams it is apparent from these disclosures that not all organic halides are removed from a process stream contacted with these and other materials of the prior art. Furthermore, there is no disclosure of the removal of methallyl chloride or MDBCP from such hydrocarbon streams; nor is there any teaching from which it would be concluded that a particular contact medium is preferred over others for the removal of methallyl chloride or MDBCP from a hydrocarbon stream.

SUMMARY OF THE INVENTION

It has surprisingly been found that the concentration of organic halides in hydrocarbon solvents used in the halogenation of butyl rubber can be substantially reduced by contacting the hydrocarbon solvent with an activated alumina. In particular, methallyl chloride and methyl dibromochloropropane are removed from the hydrocarbon solvent. As a consequence, the concentration of these halides in the final rubber product is substantially reduced.

In a preferred embodiment, the hydrocarbon solvent is contacted with the alumina at a temperature of about $40°$ C. to about $140°$ C. Surprisingly, the elevated temperatures result in significant improvement in halide removal.

DETAILED DESCRIPTION

Butyl rubber is a copolymer of isobutylene and a conjugated multiolefin. The useful copolymers comprise a major portion of isobutylene and a minor amount, preferably not more than 30 wt%, of a conjugated multiolefin. The preferred copolymers comprise about 85–99.5 wt% (preferably 95–99.5 wt%) isobutylene, and about 15–0.5 wt% (preferably about 5–0.5 wt%) of a multiolefin of about 4–14 carbon atoms. These copolymers are referred to in the patents and literature as "butyl rubber"; see, for example, the textbook *Synthetic Rubber* by G. S. Whitby (1954 edition by John Wiley and Sons, Inc.), pages 608–609, etc. The term "butyl rubber" as used in the specification and claims includes the aforementioned copolymers of isobutylene and about 0.5 to 20 wt% of a conjugated multiolefin of about 4–10 carbon atoms. Preferably these copolymers contain about 0.5 to about 5% conjugated multiolefin. Suitable conjugated multiolefins include isoprene, butadiene, dimethyl butadiene, piperylene, etc.

Commercial butyl rubber is a copolymer of isobutylene and minor amounts of isoprene. It is generally prepared in a slurry process using methyl chloride as a vehicle and a Friedel-Crafts catalyst as the polymerization initiator. The methyl chloride offers the advantage that $AlCl_3$, a relatively inexpensive Friedel-Crafts catalyst is soluble in it, as are the isobutylene and isoprene comonomers. Additionally, at the polymerization temperature, the butyl rubber polymer is insoluble in the methyl chloride and precipitates out of solution as fine particles. The polymerization is generally carried out at temperatures of about $-90°$ C. to $-100°$ C. See U.S. Pat. Nos. 2,356,128 and 2,356,129 incorporated herein by reference.

The polymerization process which is carried out in a draft tube reactor is continuous. Monomer feed and catalyst are continuously introduced to the reactor where an axial flow pump is located. The pump circulates the butyl rubber slurry at high velocity to provide efficient mixing and heat transfer. Polymer slurry containing about 20–30 wt% butyl rubber in methyl chloride continuously overflows from the reactor through a transfer line.

Where the desired product is the butyl rubber itself, the slurry is fed through the transfer line to a flash drum operated at about 140–180 kPa (1.38–1.58 atm. abs.) and 65°–75° C. Steam and hot water are mixed with the slurry in a nozzle as it enters the drum to vaporize methyl chloride and unreacted monomers which pass overhead and are recovered, and the polymer-water slurry is finished by water removal and drying. Where, however, it is desired to produce a halogenated butyl rubber it is necessary to prepare a solution of the rubber. In the preferred method of halogenation a "solvent replacement" process is utilized. Cold butyl rubber slurry in methyl chloride from the polymerization reactor is passed directly to an agitated solutioning drum containing liquid hexane. Hot hexane vapors are introduced to flash overhead some of the methyl chloride diluent and unreacted monomers. Solution of the fine slurry particles occurs rapidly. The resulting solution is stripped to remove traces of methyl chloride and monomers, and brought to the desired concentration for halogenation by flash concentration. Hexane recovered from the flash concentration step is condensed and returned to the solution drum.

In the halogenation process butyl rubber in solution is contacted with chlorine or bromine in a series of high-intensity mixing stages. Hydrochloric or hydrobromic acid is generated during the halogenation step and must be neutralized. For a detailed description of the halogenation process see U.S. Pat. Nos. 3,029,191 and 2,940,960, as well as U.S. Pat. No. 3,099,644 which describes a continuous chlorination process, all of which patents are incorporated herein by reference.

Inevitably during the halogenation process minor amounts of polymerization monomers which remain in the hexane are halogenated. In the chlorination process MAC is formed. Where the hexane is used interchangeably for both chlorination and bromination of butyl rubber, the MAC is brominated to form 2-methyl-1,2-dibromo-3-chloropropane (MDBCP). Both organic halogen compounds are toxic. The MDBCP, however, is of particular concern because in addition to being a potential carcinogen it may cause male sterility. Furthermore, as the concentration of these compounds builds up in the solvent, trace amounts begin to be found in the finished polymer. During the compounding and use of the rubber, these halides become airborne and cause health hazards to rubber processing workers. It is essential, therefore, to remove the organic halides from the solvent used in the halogenation process.

While a wide variety of compounds will remove halides to some extent from a hydrocarbon stream activated alumina has been found to be the most effective adsorption medium. The term "activated alumina" as used in the specifications and claims means dehydrated alumina of high surface area, conventionally used in the butyl rubber art among others as a desiccant to remove water from methyl chloride or other streams. Illustrative examples of commercially available material which meets this description of activated alumina are Kaiser 201, ALCOA H-151 and PECHINEY A.

In the practice of this invention, the hydrocarbon is contacted with the alumina on a continuous basis using a column packed with alumina. The hydrocarbon is preferably pumped upward through a vertical bed of alumina. It is well within the skill of those in the art to use a modification of this technique for contacting the hydrocarbon stream with the alumina. For example, the hydrocarbon can be passed through the column downward, or in several vessels in series.

Substantially all of the objectionable halides can be removed from a liquid hydrocarbon stream in a single pass through a bed of alumina at a flow rate of one volume of hydrocarbon to one volume of alumina per hour (1 v/v/hr) at 60° C. It is preferred, however, that the purification process be conducted at elevated temperatures, e.g., about 80° C. to about 140° C. At 60° C. the reaction rate constant for halide removal is 0.086 $min^{-1}$ while at 140° C. the reaction rate constant is 0.400 $min^{-1}$. Hence, it is evident that increasing temperatures have a beneficial effect on the rate of halide removal.

Not wishing to be bound by theory, it is believed that the mechanism of halide removal is a catalytic chemiadsorption process. That is, in addition to physical adsorption, a chemical reaction takes place converting the organic halide to an oxygenated and other organic compound and an inorganic halide. Hence, while decreasing the temperature improves adsorption rate, increasing the temperature increases the chemical reaction rate. Since the rate controlling factor is the chemical reaction, improved results are seen with increasing temperature.

The capacity of alumina for halides in the process of this invention is about 3 wt% chloride (as chlorine) and about 6 wt% bromide (as bromine). Unlike a conventional low temperature adsorption process the alumina cannot be regenerated for the purpose of this invention by hot gas regeneration. It is necessary to first caustic treat and water wash the alumina. As a consequence, there is a high energy cost associated with the subsequent required water removal step. However, because of the high regeneration costs and other considerations, it has been found preferable to discard the spent alumina.

The flow rate of hydrocarbon through the alumina bed is not especially critical and can be about 0.5 v/v/hr to about 10 v/v/hr; the higher rate being associated with the higher temperature of operation. Preferably the hydrocarbon flow rate is about 0.8 v/v/hr to about 1.5 v/v/hr and the operating temperature is about 60° C. to about 100° C. While lower contact times can be used, they result in reduced removal efficiency.

The advantages of the instant invention can be more readily appreciated by reference to the following examples.

EXAMPLE I

A solution of methallyl chloride (MAC) in octane was prepared (66 ppm MAC). The solution was saturated with water (ca 300 ppm by wt). The effectiveness of activated charcoal, silica gel, and activated alumina was determined by adding 1 gram of each material to a vial transferring 20 ml of the MAC solution to the vial and shaking for three hours at room temperature (23° C.). The samples were then permitted to stand for 19 hours at room temperature. At the end of the 22 hour period, the concentration of MAC in the octane was determined and the percent MAC removed calculated.

Three different activated charcoals were tested, they are identified as follows:

A-"NUCHAR"; WESTVACO CO. 20±50 mesh
B-Coconut activated charcoal 6×12 mesh
C-"Whitcarb", Witco Chemical Co., 12×30 mesh The alumina used was Kaiser 201 activated alumina. The results are shown in Table I.

TABLE I
EFFECTIVENESS OF ADSORBENTS

| ABSORBENT | PARTICLE SIZE | % REMOVAL OF MAC (22 hrs) |
|---|---|---|
| Activated Charcoal "A" | 20 × 50 mesh | 11.0 |
| Activated Charcoal "B" | 6 × 12 mesh | 13.0 |
| Activated Charcoal "C" | 12 × 30 mesh | 4.8 |
| Silica Gel | 28 × 200 mesh | 26.0 |
| Alumina | ⅛"-3/16" Ball | 96.0 |

While all of the materials tested demonstrate some capacity for the removal of MAC, only the alumina removed a significant amount of MAC (at least 96%). Within the limits of the analytical procedures used this, value represents 96–100% removal.

EXAMPLE II

The experiment of Example I was repeated using alumina as the adsorbent with the MAC concentration in octane being 85 ppm. Again, at least 96% of the MAC was removed.

EXAMPLE III

Example II was repeated using pentane as the solvent. The tests on alumina were run at 60° C. and 140° C. The reaction rate for MAC removed was calculated for each run. The results are shown in Table II.

TABLE II
$Al_2O_3$ REACTION RATE FOR MAC REMOVAL

| $Al_2O_3$ (g) | SOLVENT (Ml) Wet | CONTACT TIME (hrs) | TEMP (°C.) | MAC REMOVAL (%) | REACTION RATE K min$^{-1}$ |
|---|---|---|---|---|---|
| 1.0 | pentane (20 Ml) | 6 | 60 | 86.1 | 0.0055 |
| 1.0 | pentane (20 Ml) | 1.5 | 140 | 69.5 | .013 |

The 69.5% removal of MAC at 140° C. was accomplished in 1.5 hours as compared to 86.1% removal in 6 hours at 60° C. Hence, increasing temperature increases the removal rate of MAC.

EXAMPLE IV

Continuous flow tests were made to measure the effectiveness of alumina for MAC removal on a continuous basis similar to that which might be utilized in a butyl rubber plant.

The test equipment consisted of two columns in tandem, both immersed in a regulated water bath. Fluid was pumped from a MAC containing fluid reservoir through the columns. The fluid was cooled after exiting the columns using a cold water bath. Samples of the cooled fluid were taken at a sampling nozzle and the remainder of the fluid returned to the fluid reservoir.

The test conditions and results are shown in Table III.

TABLE III

| Solvent | Alumina (g) | Residence Time (min) | Temp (°C.) | Initial Reaction Rate (K min$^{-1}$) |
|---|---|---|---|---|
| Wet Pentane | 86.4 | 5.75 | 60 | 0.09 |
| Wet Pentane | 43.2 | 8.62 | 140 | 0.40 |

These results show that the alumina has a positive temperature coefficient and the removal rate is four times greater at 140° C. than at 60° C. The capacity of activated alumina for MAC was found to be 6.1 g/100 g.

EXAMPLE V

Alumina was tested for its effectiveness for removal of MDBCP and 1,2,3-tribromo-2-methylpropane (TBMP). The test set up of Example IV was utilized using Pechiney A activated alumina. A solution of 1.1 wt% DBMCP and 1.3 wt% TBMP in hexane was contacted with alumina. About 70–90% of the brominated compounds were removed in a single pass through the column using a 10 minute residence time at 80° C. The capacity of alumina was estimated to be 2.7 g/100 g for DBMCP and 5.1 g/100 g alumina for TBMP.

A wide range of other compounds was tested for effectiveness in MAC removal. The ineffective compounds included ozone, $CaCl_2/CaSO_4$, Zn/Mg (metal), NaOH, ZnO, CaO, $FeCl_3$, sodium, methylate, sodium acetate, triethyl aluminum and diisobutyl aluminum hydride.

It is apparent from the foregoing examples that, surprisingly, the removal of MAC, MDBCP and tribromo isobutane from the hydrocarbon solvent by alumina is enhanced at elevated temperatures. This is an unexpected result since it is an art recognized phenomenon that adsorption processes are more effectively carried out at temperatures below 20° C., and more preferably below 0° C. In the practice of this invention, on the other hand, the chemisorption process is carried out at a temperature of at least 20° C.; preferably at least 40°

C.; more preferably at a temperature of at least 60° C. Hence, a wide range of temperatures are suitable for use in the practice of this invention, e.g., about 20° C. to about 140° C.; preferably 40° C. to about 140° C.; more preferably about 60° C. to about 100° C., e.g., 80° C.

What is claimed is:

1. In a process for halogenating butyl rubber, said rubber including minor amounts of at least one monomer from which said rubber is prepared, the halogenation being carried out by dissolving said rubber in a hydrocarbon solvent and contacting the rubber/solvent solution with a halogen wherein the halogen is chlorine or bromine, whereby said monomers are halogenated incidental to the rubber halogenation to form organic halides, the halogenated rubber being separated from the hydrocarbon solvent and the solvent being recovered for recycling in a subsequent halogenation process, at least a portion of said organic halides being concentrated in said solvent, the improvement which comprises removing substantially all of the organic halides selected from the group consisting essentially of 2-methyl-3-chloropropene-1,2-methyl-1,2-dibromo-3-chloropropane, tribromo isobutane or mixtures thereof from said solvent by contacting said solvent with an activated alumina at a temperature of at least 20° C. for a time sufficient to remove said halides from said solvent.

2. The process according to claim 1 wherein the temperature is at least 40° C.

3. The process according to claim 1 wherein the temperature is at least 60° C.

4. The process according to claim 1 wherein the temperature is about 40° C. to about 140° C.

5. The process according to claim 1 wherein the temperature is about 60° C. to about 100° C.

6. The process according to claim 1 wherein the hydrocarbon solvent is hexane.

7. The process according to claim 1 wherein the rubber is prepared in a slurry polymerization process, said polymerization being conducted in a vehicle which is a solvent for the monomers but a non-solvent for the rubber thereby forming a slurry of the rubber in the vehicle, the slurry comprising rubber, vehicle and unreacted monomer, the rubber being dissolved in the hydrocarbon solvent to form a solution of rubber by mixing the slurry with the hydrocarbon solvent and stripping the vehicle from the rubber/solvent solution, at least a portion of said monomers being removed and the vehicle and at least a portion of said monomers remaining in the rubber solution.

8. The process according to claim 7 wherein the vehicle is methyl chloride and the hydrocarbon solvent is hexane.

9. The process according to claim 1 wherein the halogen is chlorine.

10. The process according to claim 1 wherein the hydrocarbon solvent is utilized for a chlorination process and subsequently recycled for use in a bromination process.

11. The process according to claim 10 wherein the organic halide is methyl dibromochloropropane.

* * * * *